W. K. MILLHOLLAND.
STOP MECHANISM FOR MACHINE TOOL TURRETS.
APPLICATION FILED MAR. 6, 1917.
1,270,187.
Patented June 18, 1918.
4 SHEETS—SHEET 4.
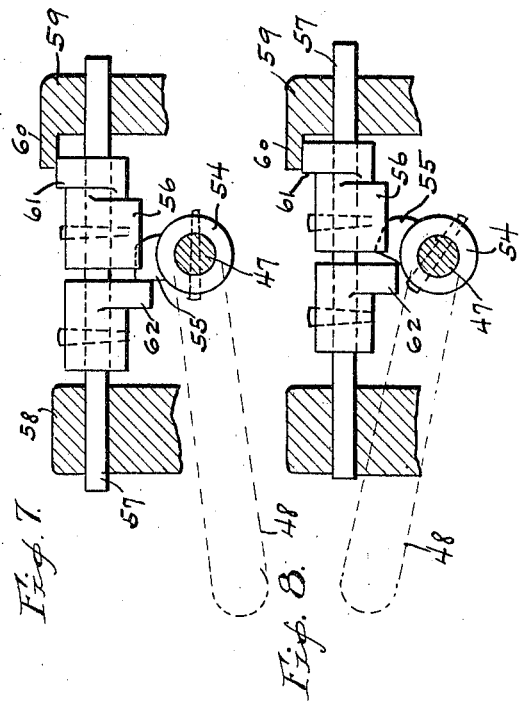
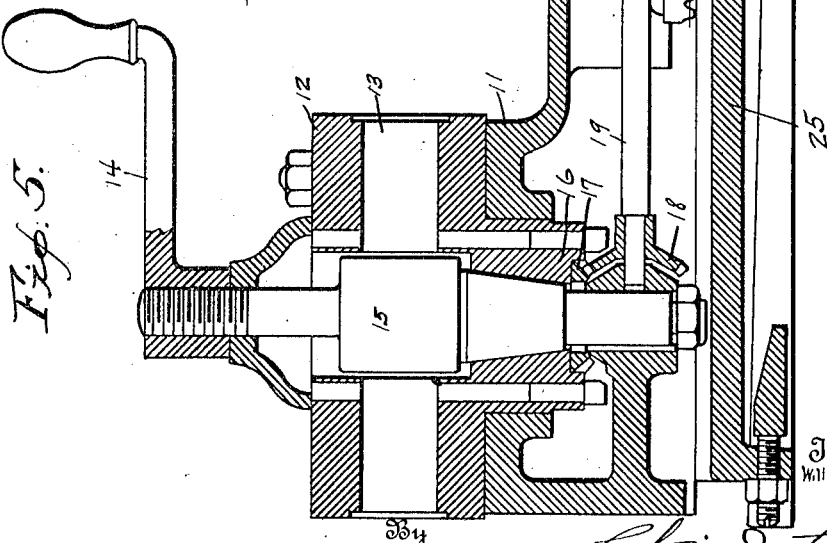
Inventor
William K. Millholland
By
Lockwood & Lockwood
Attorneys.

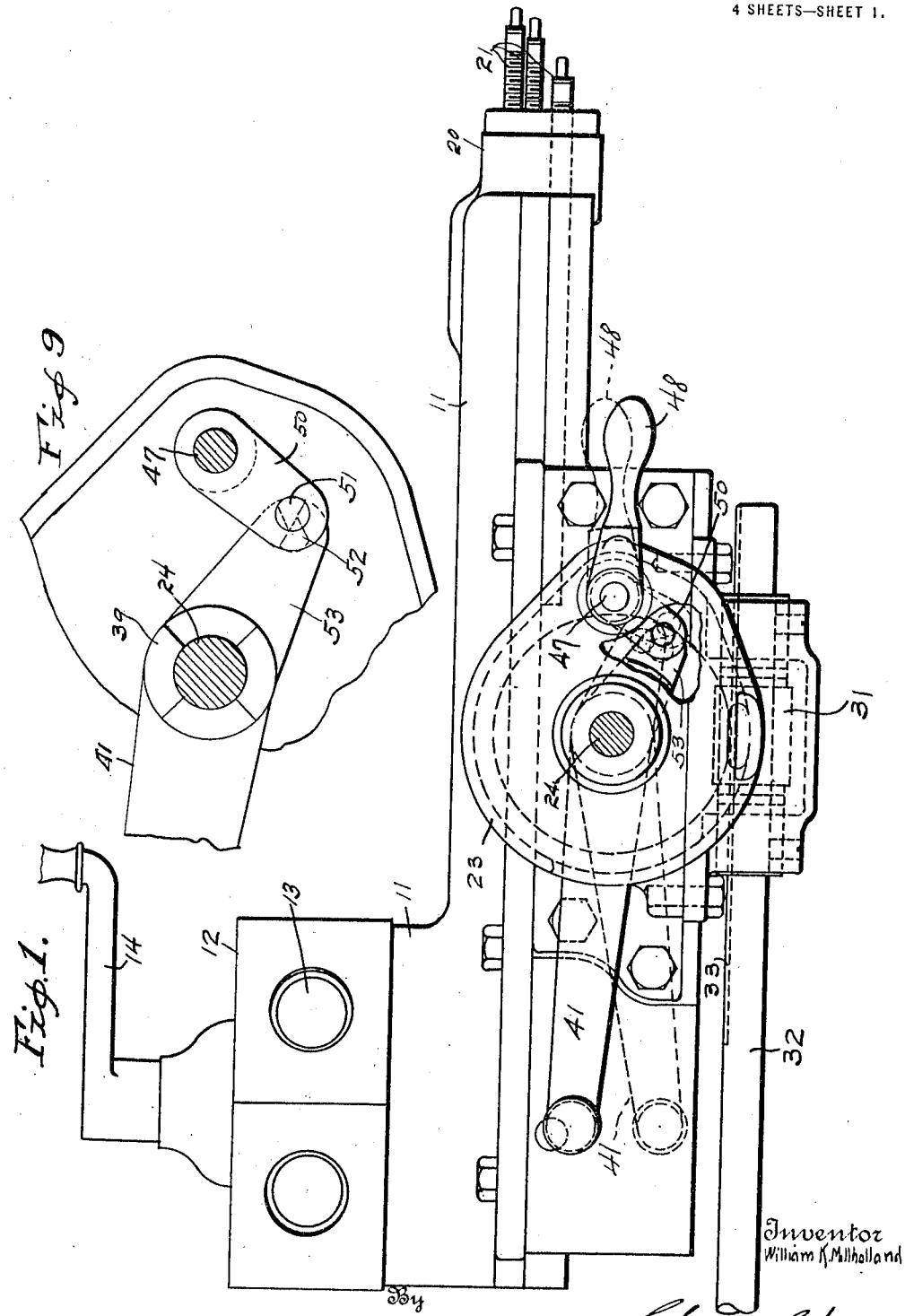

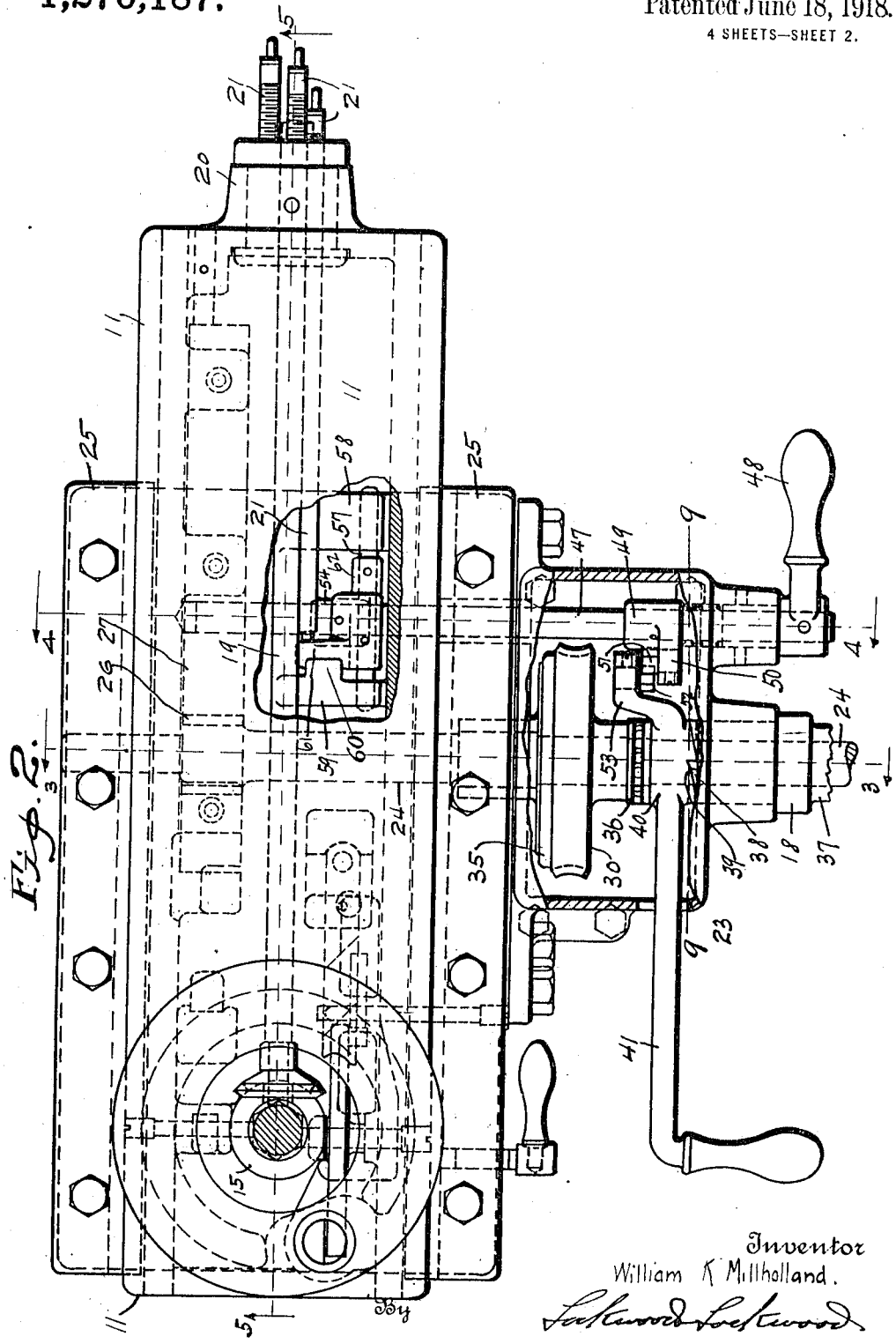

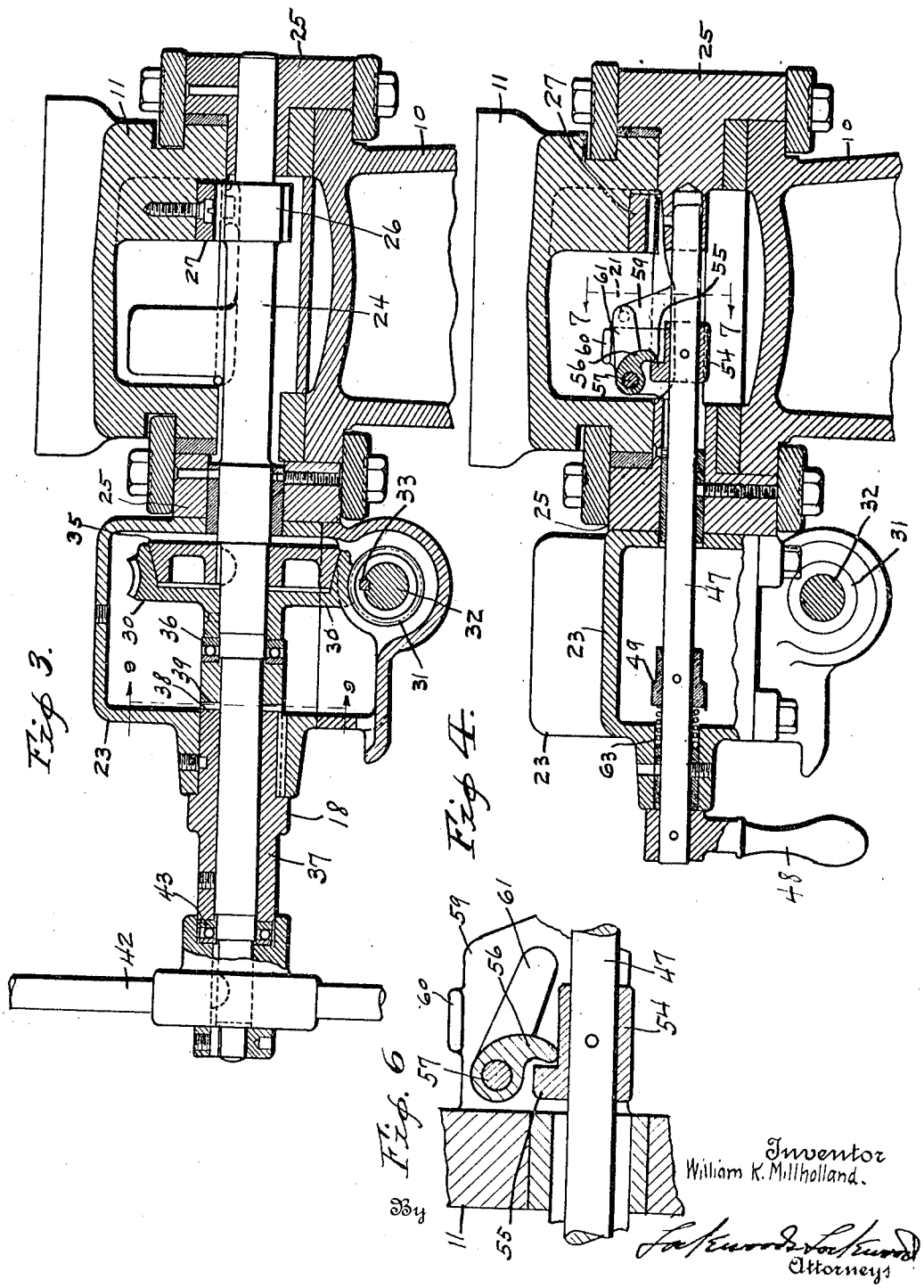

UNITED STATES PATENT OFFICE.

WILLIAM K. MILLHOLLAND, OF INDIANAPOLIS, INDIANA.

STOP MECHANISM FOR MACHINE-TOOL TURRETS.

1,270,187.        Specification of Letters Patent.        Patented June 18, 1918.

Application filed March 6, 1917. Serial No. 152,582.

*To all whom it may concern:*

Be it known that I, WILLIAM K. MILLHOLLAND, a citizen of the United States, and a resident of Indianapolis, county of Marion, and State of Indiana, have invented a certain new and useful Stop Mechanism for Machine-Tool Turrets; and I do hereby declare that the following is a full, clear, and exact description thereof, reference being had to the accompanying drawings, in which like letters refer to like parts.

This invention relates to lathes and especially to the feeding and stopping mechanism of the turret bed whereby the forward movement of the tools will be automatically stopped after having performed their operation on the work.

Ordinarily the turret is fed forward to the work by a lead screw. In this invention the turret is fed to the work by a plain shaft having a key thereon on which a worm is slidably mounted. The worm drives the feeding mechanism which is controlled by a cone clutch, said clutch being automatically thrown in and out of engagement by a mechanism controlled by adjustable stop screws.

Another feature of the invention is the mechanism for locking the clutch in position so that the turret will continue to be driven forward until a designated position is reached at which time the locking mechanism will be disengaged and the clutch released by means of previously set stop screws.

Still another feature of the invention is the construction of the stopping mechanism above mentioned which when engaged by these stop screws will cause the forward movement of the turret to be arrested and permit its return to its original position.

A further feature of the invention consists of means for removing the stopping mechanism, so as to permit the stop screws to continue their forward movement unobstructed, whereby the forward movement of the turret may be continued and stopped manually instead of automatically. This is accomplished by throwing the stopping mechanism out of the path of the stop screws, and operating the clutch by hand.

The full nature of the invention will be understood from the accompanying drawings and the following description and claims:

In the drawings, Figure 1 is a side view of the mechanism. Fig. 2 is a plan view. Fig. 3 is a section on the line 3—3 of Fig. 2. Fig. 4 is a cross section on the line 4—4 of Fig. 2. Fig. 5 is a longitudinal section on the line 5—5 of Fig. 2. Fig. 6 is an enlarged view of the tripping device shown in the central portion of Fig. 4. Fig. 7 is a cross section on the line 7—7 of Fig. 4. Fig. 8 is the same as Fig. 7, the mechanism being shown in the actuated position. Fig. 9 is a section on the line 9—9 of Fig. 2.

In the drawings there is shown herein a lathe bed 10 on which is slidably mounted a turret bed 11 having the associated mechanism commonly used in turret construction. This construction is composed of the ordinary turret 12 having sockets 13 in which the tools are secured and a clamping handle 14. The turret is provided with a spindle 15 about which it is adapted to be turned on the turret bearings 16. Secured to said bearing there is a beveled gear 17 which drives a gear 18 secured on the shaft 19. Said shaft extends longitudinally of the turret bed and is keyed at the other end thereof to a drum 20 which has a plurality of stop-screws 21 extending therethrough. By this means when the turret 12 is turned so that another tool will engage the work the drum 20 is turned and another stop screw is turned in position to engage and operate the feeding mechanism which will be hereinafter described.

On the side of the lathe bed there is mounted a housing 23 through which a driving shaft 24 extends which has its bearing in a stationary frame 25 on the lathe. Keyed to said shaft near one end thereof there is a pinion 26 which engages a rack bar 27, said rack bar being rigidly secured to the turret bed 11. Therefore, when the shaft 24 is operated it drives the rack and pinion so as to move the turret bed forward whereby the tool secured in the turret will engage the work. Loosely mounted on said shaft on the other end thereof, there is a worm gear 30 adapted to be engaged and driven by the worm 31. Said worm is slidably mounted on the shaft 32 and driven thereby through the key 33, the shaft 32 being continually driven by means not shown herein. By this driving means the turret feeding mechanism may be moved backward and forward independent of the driving shaft 32. Keyed to the shaft 24 there is a cone clutch which is in position to be engaged by the gear 30 for causing the shaft 24 to be operated. Secured to the housing 23 and extending outwardly therefrom there is a sleeve 37 through which the shaft 24 extends. Said sleeve is provided on its inner end with cam teeth 38 which are adapted to engage the cam teeth 39 mounted on a yoke 40. Integral with said yoke and extending outwardly through the housing 23 there is a lever 41 having a handle thereon so that when said handle is slightly turned said teeth engage each other and the yoke is forced inwardly so as to engage the thrust bearing 42 and force the gear 30 into engagement with the clutch 35 whereby the shaft 24 will be driven and the turret advanced toward the work. Keyed to the outer end of the shaft 24 there is a hand wheel 42 by means of which the shaft 24 is rotated in the opposite direction to return the turret bed to its original position after having been operated by the driving mechanism. Mounted on said shaft between the hub of the hand wheel and the sleeve 37 there is a thrust bearing 43 which takes up the thrust on the shaft caused by the pressure exerted on the clutch 35. It may, therefore, readily be seen from the foregoing description that in order to cause the advance of the turret in working position the handle 41 is slightly turned from the position shown in dotted lines in Fig. 1 to that position shown in full lines. This movement, by means of the cam teeth throw the clutch mechanism in and cause the shaft 24 to be driven by the shaft 32. When the machine has advanced so that it automatically stops, this clutch mechanism is thrown out and the turret bed stops its movement. Then the hand wheel 42 can be turned or operated so as to return the bed in the opposite direction to its original position.

Mounted in the frame 25 and extending therethrough parallel with the shaft 24 there is a shaft 47. Said shaft projects through the housing 23 and has secured on its outer end a handle 48. Mounted on said shaft within the housing is a collar 49 which has an outwardly projecting member 50 which is provided with a triangular shaped lug 51. The lug 51 is adapted to engage a like lug 52 which is secured on the arm 53 which is integral with the collar 40, whereby said lugs will be engaged when the shaft 47 is in one position and disengaged when said shaft is released so that the weight of the handle 48 drops down and turns it to another position. When so turned the lugs are disengaged and the handle 41 drops down by its own gravity and releases the clutch so that the forward movement of the turret bed is arrested.

Rigidly secured on the shaft 47 near the inner end thereof there is a collar 54 having a projecting lug 55 thereon, which is in position to be engaged by the finger 56 rigidly mounted on the shaft 57. The shaft 57 is slidably mounted in the bearings 58 and 59, the bearing 59 being provided with a flange 60. Rigidly secured on the shaft 57 and the finger 56 there is a projecting member 61 in position to engage the flange 60 so that the shaft 57 will not be turned out of position. The bearings 58 and 59, also act to limit the sliding movement of the shaft 57 as shown in Figs. 7 and 8. The projection 61 when in the position shown in Figs. 4, 7, and 8 is directly in the path of the forward movement of that particular stop screw 21 which has been adjusted for the particular tool which is in working position. As the turret bed moves forward this screw will come in contact and engage the projection 61 so that the shaft 57 will be pushed forward in its bearing and cause the finger 62 which is rigidly secured on the shaft 57 to engage the lug 55 and cause it to turn the shaft 47 as shown in Fig. 8. This will cause the lugs 51 and 52 to be disengaged and the handle 41 will drop down so that the clutch mechanism is released and the movement of the turret bed arrested. By this means the forward movement of the turret bed is controlled by the adjustment of the screws 21. If it should be desired to cause the tool to move on the work to a position advanced from that normally allowed by the stopping mechanism, the operator can pull the handle 48 outwardly against the tension of the spring 63 so that the finger 56 will drop down and rest on the face of the collar 54, as shown in Fig. 6. The projection 61 will drop down out of the way of the stop screw so that the forward movement of the turret bed will continue until manually stopped by the operator.

The invention claimed is:

1. In a turret bed for a lathe including a driving means secured thereon, a driving shaft, a worm slidably keyed on said shaft, a gear loosely mounted on said driving means in position to be engaged by said worm, a clutch keyed to said driving means in a position to engage said gear, and means for causing said clutch to engage said gear by means of which the drive of said turret will be controlled comprising a sleeve, cam teeth on one end thereof, a yoke movable and rotatable on said driving means, cam teeth on one end of the yoke for engagement with the cam teeth on the sleeve, a lever attached to the yoke for manually rotating the same, an arm attached to the opposite side of said yoke from the lever, and means engaging said arm for temporarily holding the yoke against rotation.

2. In a turret bed for a lathe including a rack secured thereon, a shaft having a pinion thereon for engaging and driving said rack, a driving shaft, a worm keyed on said driving shaft, a gear movably mounted on said first mentioned shaft, a clutch keyed to said first shaft in position to be engaged by said movable gear, a sleeve mounted on said shaft, cam teeth on one end of said sleeve, a yoke movable and rotatable on said driving shaft, cam teeth on one end of the yoke for engagement with the cam teeth of the sleeve, a lever projecting outwardly from one side of the yoke for manually rotating the same, an arm extending from the opposite side of the yoke, means engaging said arm for temporarily holding the yoke against rotion, and a hand wheel secured to the end of said first mentioned shaft for returning said turret bed after having been driven.

3. In a lathe having a turret bed slidably mounted thereon, means for driving said turret bed, a clutch mechanism for controlling said driving means, means for automatically operating said clutch mechanism whereby the forward movement of said turret bed will be arrested and manually operated means for displacing the automatically operated controlling means whereby additional forward movement of the turret bed will result.

4. In a lathe having a turret bed slidably mounted thereon, means for driving said turret bed, a clutch mechanism on said driving means, a shaft having a projecting member thereon in position to engage said driving means, means for automatically controlling said shaft whereby said clutch mechanism will be operated by said projection for causing the forward movement of said turret to be arrested and manually operated means for displacing the automatically operated movement arresting means, whereby additional forward movement of the turret bed may be made.

5. In a lathe having a turret bed slidably mounted thereon, means for driving said turret bed, a clutch mechanism on said driving means, a shaft having a projection thereon in position to release said clutch mechanism, a second shaft, means on the second shaft for partially rotating the first shaft, a projection on the second shaft, a stop screw in position to engage and operate said last projection to release said clutch whereby the forward movement of said turret bed will be arrested and means to manually lower said second projection out of the path of said stop screw, whereby additional forward movement of the turret table may be obtained.

6. In a lathe having a turret bed slidably mounted thereon, means for driving said turret bed, a clutch mechanism mounted on said driving means, a shaft having a projection thereon in position to engage and release said clutch mechanism, a collar mounted on said shaft, means for engaging said collar for turning said shaft, a projection on said collar engaging means, and a stop screw for engaging said means whereby said shaft will be turned and said clutch released for arresting the forward movement of said turret bed.

7. In a lathe having a turret bed slidably mounted thereon, means for driving said turret bed, a clutch mechanism mounted on said driving means, a shaft having a projection thereon for engaging and releasing said clutch, a collar on said shaft having a projection thereon, a finger in position to engage said projection and turn said shaft, a projection rigidly secured to said finger, and a stop screw in position to engage said last projection whereby said shaft will be caused to turn and said clutch mechanism released whereby the forward movement of said turret will be arrested.

8. In a lathe having a turret bed slidably mounted thereon, means for driving said turret bed, a clutch mechanism mounted on said driving means, a shaft having a projection thereon in position to engage and release said clutch mechanism, a collar on said shaft having a projection thereon, a shaft slidably mounted at right angles to said first mentioned shaft, a finger rigidly secured on said shaft in position to engage said collar, a projecting member rigidly mounted on said sliding shaft, and a stop screw in position to engage said projecting member whereby said second mentioned shaft will be moved so that said finger will engage and turn said first mentioned shaft whereby said clutch mechanism will be released and the forward movement of said turret arrested.

9. In a lathe having a turret bed slidably mounted thereon, means for driving said turret bed, a clutch mechanism mounted on said driving means, a shaft having a projection thereon in position to engage and release said clutch mechanism, a collar on said shaft having a projection thereon, a shaft slidably mounted at right angles to said first mentioned shaft, means on said second mentioned shaft for engaging and turning said shaft, a projection rigidly secured to said second mentioned shaft, a stop screw in position to engage said projection for turning said shaft whereby said clutch mechanism will be released and said turret bed arrested, and a finger mounted on said projection so as to engage said collar whereby said finger and projection will drop down out of the way of said stop screw when said first mentioned shaft is pulled outwardly so that said turret bed will continue in forward movement.

10. In a lathe having a turret bed slidably mounted thereon, a shaft having a pinion in position to engage and drive said turret bed, a gear loosely mounted on said shaft and driven by a worm drive, a clutch keyed to said shaft in position to engage said gear, a handle having cam teeth thereon in position to engage the cam teeth on the bearing of said shaft for causing said clutch to engage said gear and drive said turret bed, an arm mounted on said collar, a second shaft having a projecting member secured thereon in position to engage said arm for holding said gear in engaged position and a stop screw adapted to cause said second mentioned shaft to turn whereby said projecting member will disengage said arm and release said clutch whereby the forward movement of said turret bed will be arrested.

In witness whereof, I have hereunto affixed my signature.

WILLIAM K. MILLHOLLAND.

Copies of this patent may be obtained for five cents each, by addressing the "Commissioner of Patents, Washington, D. C."